June 12, 1945.  E. R. DETRICK  2,377,998
TRIM PANEL
Original Filed July 29, 1940
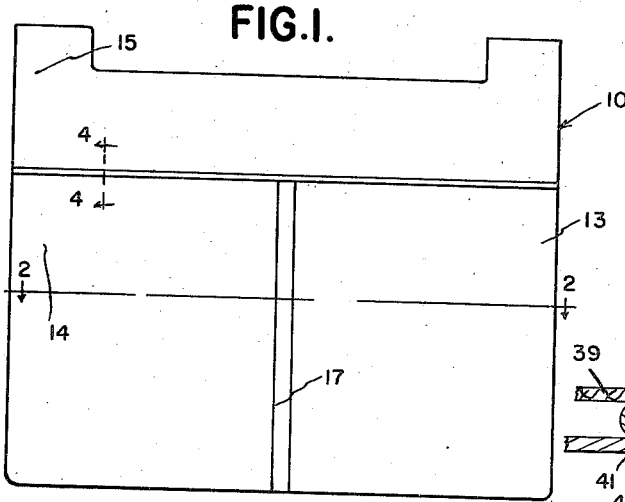
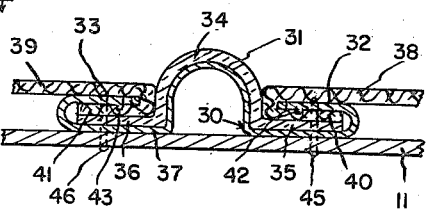
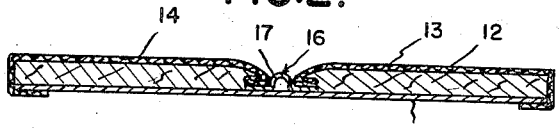
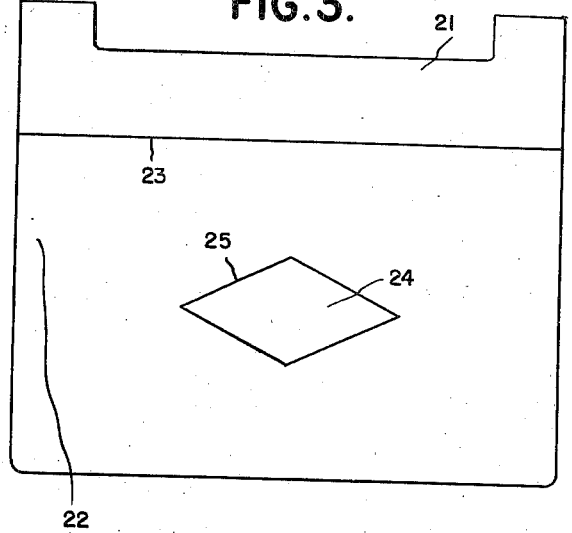
INVENTOR.
EDWARD R. DETRICK
BY
*Whittemore Hulbert & Belknap*
ATTORNEYS Patented June 12, 1945

2,377,998

UNITED STATES PATENT OFFICE 2,377,998

TRIM PANEL

Edward R. Detrick, Detroit, Mich., assignor to National Automotive Fibres, Inc., Detroit, Mich., a corporation of Delaware Original application July 29, 1940, Serial No. 348,291. Divided and this application September 27, 1943, Serial No. 503,994

9 Claims. (Cl. 45—138)

This invention relates generally to trim panels, especially decorated trim for the interior of doors and other portions of vehicle bodies, and constitutes a division of my application filed July 29, 1940, bearing Serial No. 348,291 now Patent No. 2,334,811.

It is sometimes desirable to cover trim panels and other interior trim of automotive vehicles with fabrics of different colors or shades so as to provide a two-tone or multiple-tone effect. In the past this has been accomplished by sewing the two fabrics together to provide a composite fabric, which may then be applied to trim panels or other interior portions of the vehicle. However, the sewed seam between the two different fabrics presented an unattractive appearance, and efforts were made to conceal this seam. One manner of concealing the seam was to provide a metal molding strip which was tacked through the fabric to the panel board and was intended to overlie and conceal the seam. Obviously the seam had to be perfectly straight, and while there was no difficulty in sewing straight seams, the application of the composite fabric to the panel board had to be carried out with extreme care, so that the seam could be covered by a narrow strip of molding metal.

According to the present invention, two pieces of fabric which are to be united for a composite interior trim fabric are connected by means of an anchorage strip of a particular design, as will subsequently be pointed out. As a result, this strip insures that the seam or line of juncture between the pieces of fabric will be straight both before and after the composite fabric has been applied to the panel board.

In addition, this anchorage strip serves as a reinforcing means for the panel, so that by employing my improved construction it is possible to use a lighter and therefore less expensive foundation panel board.

A number of different effects may be obtained by slightly modified forms of anchorage strip, however at the present time it is sufficient to mention that by employing my improved anchorage strip, it is possible to obtain the effect of a molding strip. It is further possible to obtain a bead or riser intermediate two pieces of fabric which is covered with a different contrasting or harmonizing material.

It may also be pointed out that, if desired, the anchorage strip may be curved to any desired configuration so as to obtain different decorative designs.

With the foregoing general remarks in mind, it is an object of the present invention to provide two-tone trim panels of novel characteristics.

It is a further object of the invention to provide novel means for securing two pieces of fabric together.

It is a further object of the invention to provide trim panels characterized by the provision of contrasting or harmonizing fabrics in conjunction with an anchorage strip having an exposed riser of novel design.

It is a further object of the invention to provide a trim panel provided with reinforcing anchorage strips, which also were utilized to interlock adjacent pieces of trim fabric.

It is a further object of the present invention to provide a fabric having a stiff bead permanently united to one edge thereof along a line which may be straight or of predetermined curvature.

Other objects of the invention will be apparent as the description proceeds, and when taken in conjunction with the accompanying drawing, wherein:

Figure 1 is a front elevation of a trim panel illustrating the possible design which may be obtained by the present invention;

Figure 2 is a section on the line 2—2, Figure 1;

Figure 3 is a front elevation illustrating a somewhat different specific design of trim panel;

Figure 4 is a sectional view taken on the line 4—4 of Figure 1.

Referring first to Figures 1 and 2, I have illustrated generally at 10 an upholstered trim panel comprising a panel board 11, padding material 12, trim fabrics 13, 14 and 15, and metallic locking strip 16.

It will be understood that the padding material 12 may be of any desired type. The foundation panel board 11 may be an asphalt board or a panel board sold under the trade name Masonite. The padding material 12 may be wadding of a suitable type, or it may be loosely aggregated cotton, jute, or other fibrous material. The purpose of the padding material is to give an appearance of richness to the completed panel which is otherwise not obtained.

Panels of this type are adapted to be secured to doors of vehicles and it is to be understood that while I have illustrated my invention as applied to a trim panel for attachment to a door, the invention is not thus limited. The invention may be applied to other panels, and in fact, as will be obvious, its application is more or less general. Thus it may be used for decorative trim in vehicles, homes, stores, theatres and the like.

By way of example, the trim panel illustrated in Figures 1 and 2, may be covered by a composite trim fabric made up of the fabric pieces 13, 14 and 15. The upper piece 15 may, for example, be of a dark tone, whereas the pieces 13 and 14 may be of a harmonizing or contrasting color or shade. The metallic strip 16 has a bead or riser 17 intermediate the pieces of fabrics 13 and 14 which is exposed and which may, of course, be chromium plated or otherwise treated to present an attractive appearance.

In Figure 3 I have illustrated a somewhat different design for the purpose of indicating the flexibility of the present invention. In this case the trim panel indicated generally at 20 may be covered with a composite trim fabric comprising an upper portion 21, which may be of a definite color, and a lower portion 22 which may be of a harmonizing or contrasting color. The pieces 21 and 22 are secured together along the line 23, and a metallic strip of the type disclosed herein is employed. Intermediate the lower portion 22 I provide a decorative fabric insert 24 which may be of the same color as the upper portion 21, or of a different harmonizing or contrasting color. The lines of conjuncture 25, between the insert 24 and the fabric 22, are formed by metallic strips such as 16 or by strips similar to that illustrated in Figure 4.

It may be stated at this time that while the invention is most readily practiced in a manner to provide straight-line seams of the conjunctures, it need not be limited thereto, and it is within the contemplation of the present invention that the metallic strip may be curved transversely to provide curved or irregular lines of conjunctures between the various pieces of fabric.

Referring now to Figure 4, I have indicated in section an anchorage strip 30 which is made of a light bendable metal. I have found that excellent results are obtained where these strips are formed of brass, but it is obvious that any suitable material may be employed. I prefer to employ metal, but it is entirely possible that other materials, such for example as suitable resins, might be employed. Thus, for example, resins might be formed to the same shape as the metallic strips, and the interlock between the fabrics and the strips could be obtained by the application of heat to the resin strips.

I have found that where brass is employed as the material from which the strips 30 are formed, best results are obtained when the strip is between .010 and .015 inch in thickness. Obviously the thickness of the strip is not critical, and will be selected with well-known practice and in accordance with the specific material employed.

As previously stated, by employing my improved metal anchorage strip, it is possible to use a lighter gauge panel board 11, for the reason that the metal strip 30 serves as a reinforcing means which strengthens and lends certain rigidity to the panel board. It will be understood, of course, that the light gauge strips 30 are not themselves extremely rigid and will conform to the curvature of the panel board when the same is required to assume a curvature during its application.

As illustrated in Figure 4 the metal strip 30 has a centrally disposed longitudinally extending raised hollow bead or riser 31 and is provided at opposite longitudinal side edges thereof with return bent flanges 32 and 33 respectively. Covering the bead 31 and conforming in shape thereto is a sheet 34 formed from plastic material and having flanges 35 and 36 respectively between the base 37 of the strip 30 and the return bent flanges 32 and 33 thereof. The fabrics 38 and 39 extend over the flanges 32 and 33 of the strip and have inturned or folded edge portions 40 and 41 clamped between the flanges 32, 33 of the strip and the flanges 35, 36 of the covering 34. If desired, tangs 42 and 43 may be struck out from the flanges 32 and 33 of the strip to pierce and hold the inturned edge portions 40 and 41 of the fabrics 38 and 39 against displacement relative to the strip. Also suitable fastening elements such as the staples 45 and 46 may extend through the flanges 32, 33 of the strip, inturned edge portions 40, 41 of the fabrics, flanges 35, 36 of the covering, and the base 37 of the strip for engagement with the panel board 11 to hold the parts in assembled relation. In this connection it will be noted that the tangs 42, 43 and staples 45, 46 are beneath and concealed by the fabrics 38 and 39.

As is well-known, plastics suitable for the covering 34 may be obtained in a wide variety of colors, hence this arrangement enables a manufacturer to produce any desired harmony or contrast between the covering, beads and trim fabrics.

The metallic strips previously described may be very cheaply constructed and the metal employed in them is, of course, very inexpensive. As a result, the material going to make up the trim panel is no more expensive than present day constructions which lack the flexibility of design in the present construction. In addition, the present strips lend themselves to very rapid assembly and do not require highly skilled labor. As a result, the labor costs of assembling the completed panels is no more expensive than present less attractive panels, and is in fact considerably less expensive than present types of assembly which obtain anything like equivalent results.

Reference was previously made to the fact that instead of employing metallic strips, strips of other material could be employed. By employing metallic strips the interlock formed by the tanks 42, 43 is exceptionally efficient, but in its broader aspects, the invention need not be practiced with metallic strips. If a strip of resinous material or adhesive coated, bendable cardboard were employed, it would still be possible to obtain perfectly straight seams having straight folded edges, which is very desirable in this type of construction. If the strips were formed of resinous material, the sealing bond could be obtained by the application of heat to the fabric overlying the folded strips. If adhesive were employed, it would be necessary only to apply sufficient pressure to cause initial setting of the adhesive.

It may also be mentioned that rubber may be employed as the locking medium. Thus, for example, the strips may be formed of any suitable material and provided with thin unvulcanized rubber coatings, or provided with a film of vulcanizing latex. The final assembly of the operation would then include the application of heat and pressure to vulcanize the rubber, thus forming a perfect bond between the strips and fabrics.

What I claim as my invention is:

1. In a trim structure, a foundation member, a metal strip having a base anchored on said member and having return bent flanges at opposite longitudinal edges thereof, the base of said strip being provided between said flanges with a raised bead, a covering for said bead formed from plastic material and having portions extending laterally between the base and return bent flanges of the strip, and trim fabrics extending over the return bent flanges of the strip and provided upon opposite sides of the covering with inturned edge portions anchored between the laterally extending portions of the covering and the return bent flanges of the strip.

2. In a trim structure, a foundation member, a strip having a base on said member and having open return bent flanges at opposite longitudinal edges thereof, a raised bead on the base between the flanges having an exposed outer portion formed from plastic material, said bead having lateral flanges between the base and flanges of the strip, trim fabrics extending over said flanges and having return bent edge portions extending between the flanges of the bead and the flanges of the strip, and fastening elements for the strip disposed beneath and concealed by the trim fabrics and engaging the foundation member.

3. In a trim structure, an anchorage strip having a base provided at opposite side edges thereof with open return bent flanges and provided at approximately the longitudinal median line thereof between said flanges with a raised bead, said bead and base having a covering formed from plastic material, trim fabrics extending over the return bent flanges toward the bead and having inturned edge portions extending between the return bent flanges of and the covering for the base of said strip, a support for the strip, and means beneath and concealed by the fabrics for securing the same and said strip to said support, including means extending through the return bent flanges and base of said strip.

4. In a trim structure, a metal strip having a base provided at opposite side edges thereof with open return bent flanges and provided between said flanges with a raised bead, said bead and base heaving a covering formed from plastic material, trim fabrics extending over the return bent flanges toward the bead and having inturned edge portions extending between the return bent flanges of and the covering for the base of said strip, a support for the strip, and means beneath and concealed by the fabrics for securing the same and said strip to said support, including fasteners engaging the return bent flanges and base of said strip and the intermediate inturned edge portions of said fabrics.

5. In a trim structure, a foundation member, a metal strip having a base anchored on said member and provided at opposite longitudinal edges thereof with open return bent flanges, said base being provided between said return bent flanges with a raised bead, a covering for said bead having lateral flanges between the base and return bent flanges of said strip, and trim fabrics extending over said return bent flanges and having inturned edge portions clamped between the flanges of the covering and the return bent flanges of said strip.

6. In a trim structure, a foundation member, a strip having a base anchored on said member and provided with opposed open return bent flanges, said base being provided between said opposed return bent flanges with a raised bead, a covering for said bead having lateral flanges between the base and return bent flanges of said strip, and trim fabrics extending over said return bent flanges and having inturned edge portions clamped between the flanges of the covering and the return bent flanges of said strip.

7. In a trim structure, a foundation member, a metal strip having a base on said member and provided at opposite longitudinal edges thereof with open return bent flanges, said base being provided between said return bent flanges with a raised bead, a covering for said bead having lateral flanges between the base and return bent flanges of said strip, trim fabrics extending over said return bent flanges and having inturned edge portions between the flanges of the covering and the return bent flanges of said strip, and means beneath and concealed by the trim fabrics connecting the inturned edge portions thereof and the flanges respectively of the strip and covering to said foundation member, whereby the inturned edge portions of the fabrics are anchored between the flanges of the strip and the flanges of the covering.

8. In a trim structure, a foundation member, a strip having a base on said member and provided with opposed open return bent flanges, said base being provided between said opposed return bent flanges with a raised bead, a covering for said bead having lateral flanges between the base and return bent flanges of said strip, trim fabrics extending over said return bent flanges and having inturned edge portions between the flanges of the covering and return bent flanges of said strip, and means connecting the inturned edge portions of said fabrics and the flanges respectively of the strip and covering to said foundation member, whereby the inturned edge portions of the fabrics are anchored between the flanges of the strip and the flanges of the covering.

9. In a trim structure, a foundation member, a strip having a base on said member and provided with opposed open return bent flanges, said base being provided between said opposed return bent flanges with a raised bead, a covering for said bead having lateral flanges between the base and return bent flanges of said strip, trim fabrics extending over said return bent flanges and having inturned edge portions between the flanges of the covering and the return bent flanges of said strip, means connecting the inturned edge portions of said fabrics and the flanges respectively of the strip and covering to said foundation member, and means cooperating with the return bent flanges of the strip for holding the inturned edge portions of the fabrics against displacement.

EDWARD R. DETRICK.